US012591164B2

(12) United States Patent
Vreeland et al.

(10) Patent No.: US 12,591,164 B2
(45) Date of Patent: Mar. 31, 2026

(54) HIGH EFFICIENCY TUNABLE BEAM STEERING DEVICE BASED ON PANCHARATNAM PHASE

(71) Applicants: Kent State University, Kent, OH (US); Government of the United States as Represented by the Secretary of the Air Force, Wright-Patterson AFB, OH (US)

(72) Inventors: Brandon Vreeland, Kent, OH (US); Philip Bos, Kent, OH (US); Andre Van Rynbach, Dayton, OH (US)

(73) Assignees: KENT STATE UNIVERSITY, Kent, OH (US); GOVERNMENT OF THE UNITED STATES AS REPRESENTED BY THE SECRETARY OF THE AIR FORCE, Wright-Patterson, OH (US)

( * ) Notice: Subject to any disclaimer, the term of this patent is extended or adjusted under 35 U.S.C. 154(b) by 0 days.

(21) Appl. No.: 18/806,923

(22) Filed: Aug. 16, 2024

(65) Prior Publication Data

US 2025/0060647 A1 Feb. 20, 2025

Related U.S. Application Data

(60) Provisional application No. 63/532,978, filed on Aug. 16, 2023.

(51) Int. Cl.
G02F 1/29 (2006.01)

(52) U.S. Cl.
CPC ..................................... G02F 1/292 (2013.01)

(58) Field of Classification Search
CPC ............. G02F 1/292; G02F 1/29; G02F 1/294
See application file for complete search history.

(56) References Cited

U.S. PATENT DOCUMENTS

| | | | |
|---|---|---|---|
| 2017/0059899 A1 | 3/2017 | Su et al. | |
| 2017/0192263 A1* | 7/2017 | Jiang ..................... | G02F 1/1323 |
| 2017/0269441 A1 | 9/2017 | Murata et al. | |
| 2021/0011353 A1 | 1/2021 | Yousefzadeh et al. | |
| 2021/0278921 A1* | 9/2021 | Morinaga ............. | G06F 3/0412 |
| 2022/0373855 A1* | 11/2022 | Yousefzadeh .......... | G02B 26/08 |

FOREIGN PATENT DOCUMENTS

CN        102023414        4/2011

OTHER PUBLICATIONS

Yousefzadeh et al. "Efficiency optimization of a tunable non-mechanical beam steering device based on fringe field switching and Pancharatnam phase" Mar. 2021 Proc, SPIE vol. 11707 pp. 117070D 1-16 (Year: 2021).*

* cited by examiner

*Primary Examiner* — Tracie Y Green
(74) *Attorney, Agent, or Firm* — Lippes Mathias LLP

(57) ABSTRACT

A tunable optical beam steering device includes: a first means for providing surface localized in-plane electric fields on a first substrate and also on a second substrate that together define a sandwich structure containing a liquid crystal material; a second means for providing electric fields between the two substrates that can be at an angle to the surface normal, or along the surface normal; and an alignment layer on a surface of each substrate that causes the liquid crystal director to align with a small angle relative to the surface normal and whose projection onto the plane of the substrates is different on the two substrates.

20 Claims, 21 Drawing Sheets
(6 of 21 Drawing Sheet(s) Filed in Color)

| Electrode # | 1 | 2 | 3 | 4 |
|---|---|---|---|---|
| Top | 6 | 5.5 | 5 | 4.5 |
| Bottom | 1 | 0.5 | 0 | -0.5 |

HIGH EFFICIENCY TUNABLE BEAM STEERING DEVICE BASED ON PANCHARATNAM PHASE

This application claims the priority benefit of U.S. Provisional Application No. 63/532,978 filed Aug. 16, 2023 and titled "HIGH EFFICIENCY TUNABLE BEAM STEERING DEVICE BASED ON PANCHARATNAM PHASE," which is incorporated by reference in its entirety.

STATEMENT REGARDING FEDERALLY SPONSORED RESEARCH

This invention was made with government support under Grant/Contract No. FA8650-19-F-1025 awarded by the Air Force Research Laboratory. The government has certain rights in the invention.

BACKGROUND

The present disclosure relates to the optoelectronic arts, including electrically tunable or adjustable liquid crystal devices, methods of making the same, methods of tuning or adjusting the same, and devices or apparatuses using the same. However, the following will also find application in conjunction with other apparatuses, articles of manufacture, and methods.

There is substantial interest in non-mechanical devices for tunable or adjustable manipulation of light. For example, tunable beam steering devices that can steer a beam of light along different angles or directions responsive to an electrical control input have numerous applications in optics, optical systems, electrooptical systems, and so forth.

A Pancharatnam phase device (PPD) for beam steering has the structure shown in FIG. 1. It includes a thin film of birefringent material, where the phase retardation of the material is ½ wave, and where the optic axis of the film varies along the aperture of the beam steering element. It is shown in the figure that the director (optic axis) is in the plane of the cell and rotated by β(x) across the aperture.

Considering a device with this structure, if it is illuminated with circularly polarized light, the exiting light will be the opposite polarization state. Furthermore, the phase difference between light exiting from two points in the aperture is related to their difference in the value of p with the relation: $\Gamma=2*\beta$. Therefore, if the value of p varies linearly across an aperture, the phase profile does as well as shown in FIG. 2.

The phase profile shown is that of a prism and will deflect incident light at an angle given from the relation: $\sin\theta=OPD/\Delta x=(\Delta\Gamma\lambda)/(2\pi\Delta x)$, which can be written as $\sin\theta=(\lambda\Delta\beta)/(\pi\Delta x)$. Furthermore, the efficiency of this type of device can be much greater than that found for conventional diffraction gratings.

Most devices using the PPD concept for beam steering are either two state or three state devices. Two continuously tunable devices are described below.

Vertical-Continuous Optical Phase Array (V-COPA) Device:

There has been at least one report of a tunable device by Shi et al. in U.S. Pat. No. 8,531,646. It is based on controlling the ends of a 180-degree rotation of the director and continuously pulling or pushing the those ends to change the pitch and therefore the beam deflection angle of the device. U.S. Pat. No. 8,531,646 is incorporated by reference herein in its entirety.

This device used near homeotropic alignment. That approach used strong in plane fields at specific locations to "pin" directors at ±90°. A strong vertical field is applied to tilt all LC molecules in the plane of the device. The spiral pattern is then formed solely by elastic energies introduced by the "pinned" molecules.

This approach works well at small spiral pitch patterns (large steering angles) but is very slow and exhibits degraded efficiency for large spiral pitches (small steering angles).

In-Plane Electric Field Device:

A previous device was designed in response to the slow switching speed of the V-COPA device and used planar alignment and in-plane electric fields to construct the in-plane spiral pattern. That approach has fast relaxation times due to high restoring force provided by the in plane initial alignment and controllable in plane electric fields. However, a topological defect is present due to the planar alignment. This defect, known as a trapped pi wall, causes a significant loss in efficiency at large steering angles. An example transmissive beam steering device using this in-plane approach was shown to be able to steer to a maximum angle of 7.5° with 70% efficiency using 1550 nm wavelength light. Unfortunately, this device exhibited low efficiency.

There is a need for non-mechanical, electrically controlled devices for steering and focusing light with fast switching time and high efficiency.

BRIEF DESCRIPTION

In the device disclosed here, the PPD device idea is implemented with a LC cell that provides near vertical alignment of the LC director at the substrates, and an innovative voltage scheme that modifies the in-plane and out of plane alignment of the LC director. The result leads to a PPD with efficiencies and maximum steering angles previously not attainable for tunable devices with wide apertures. The maximum steering angle demonstrated in an example device for IR light is ±15° and shows modeled efficiency of 90%.

Disclosed, in some embodiments, is a tunable optical beam steering device including: a first means for providing surface localized in-plane electric fields on a first substrate and on a second substrate that together define a sandwich structure containing a liquid crystal material; a second means for providing electric fields between the two substrates that can be at an angle to the surface normal, or along the surface normal; and an alignment layer on a surface of each substrate that causes the liquid crystal director to align with a small angle relative to the surface normal and whose projection onto the plane of the substrates is different on the two substrates.

Disclosed, in other embodiments, is a tunable liquid crystal device including in sequence: a first common conductive layer; a first insulating layer; a first array comprising a first plurality of parallel electrodes; a first alignment layer; a liquid crystal layer; a second alignment layer; a second array comprising a second plurality of parallel electrodes; a second insulating layer; and a second common conductive plane. Each electrode of the first plurality is located directly across from a different electrode from the second plurality. The device is configured to apply a voltage scheme including in sequence: a first voltage step for setting an azimuthal angle of a liquid crystal optical axis at all locations to create a linear spiral director configuration; and a second voltage step for causing the director to lie in the plane of the cell.

Disclosed, in further embodiments, is a process for controlling a director field in a tunable liquid crystal device. The liquid crystal device includes: a first common conductive plane; a first insulating layer; a first array comprising a first plurality of parallel electrodes; a first alignment layer; a liquid crystal layer; a second alignment layer; a second array comprising a second plurality parallel electrodes; a second insulating layer, wherein each electrode of the first plurality is located directly across from a different electrode from the second plurality; and a second common conductive plane. The process includes in sequence: a first voltage step for setting an azimuthal angle of a liquid crystal optical axis at all locations to create a linear spiral director configuration; and a second voltage step for causing the director to lie in the plane of the cell.

These and other non-limiting characteristics are more particularly described below.

BRIEF DESCRIPTION OF THE DRAWINGS

The patent or application file contains at least one drawing executed in color. Copies of this patent or patent application publication with color drawings will be provided by Office upon request and payment of the necessary fee. The disclosure can be more fully understood by reading the following detailed description of the embodiment, with reference made to the accompanying drawings as follows.

The following is a brief description of the drawings, which are presented for the purposes of illustrating the exemplary embodiments disclosed herein and not for the purposes of limiting the same.

DETAILED DESCRIPTION

Figure 1:
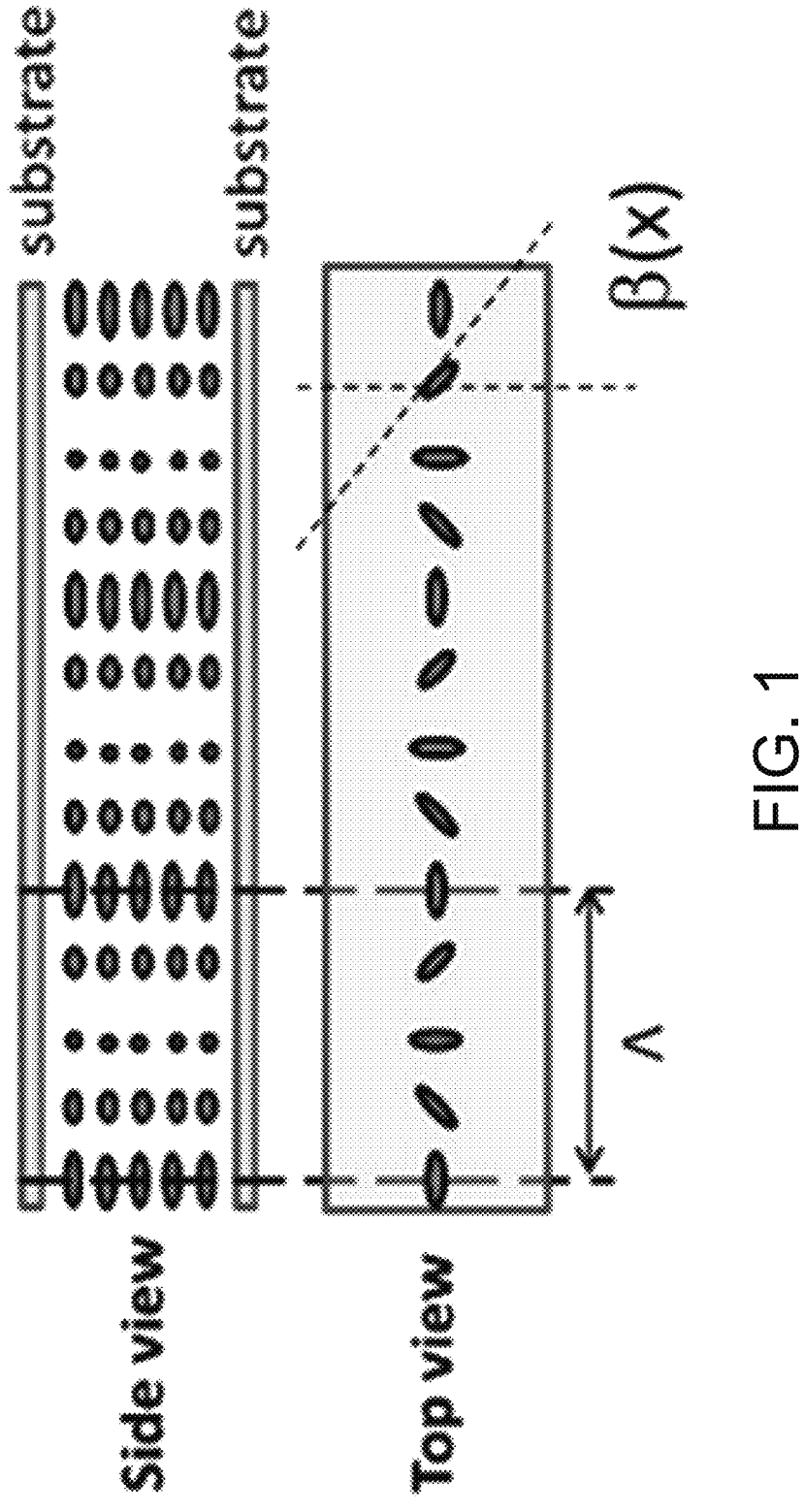
FIG. 1 includes side and top views of a Pancharatnam phase device (PPD) for beam steering.
Figure 2:
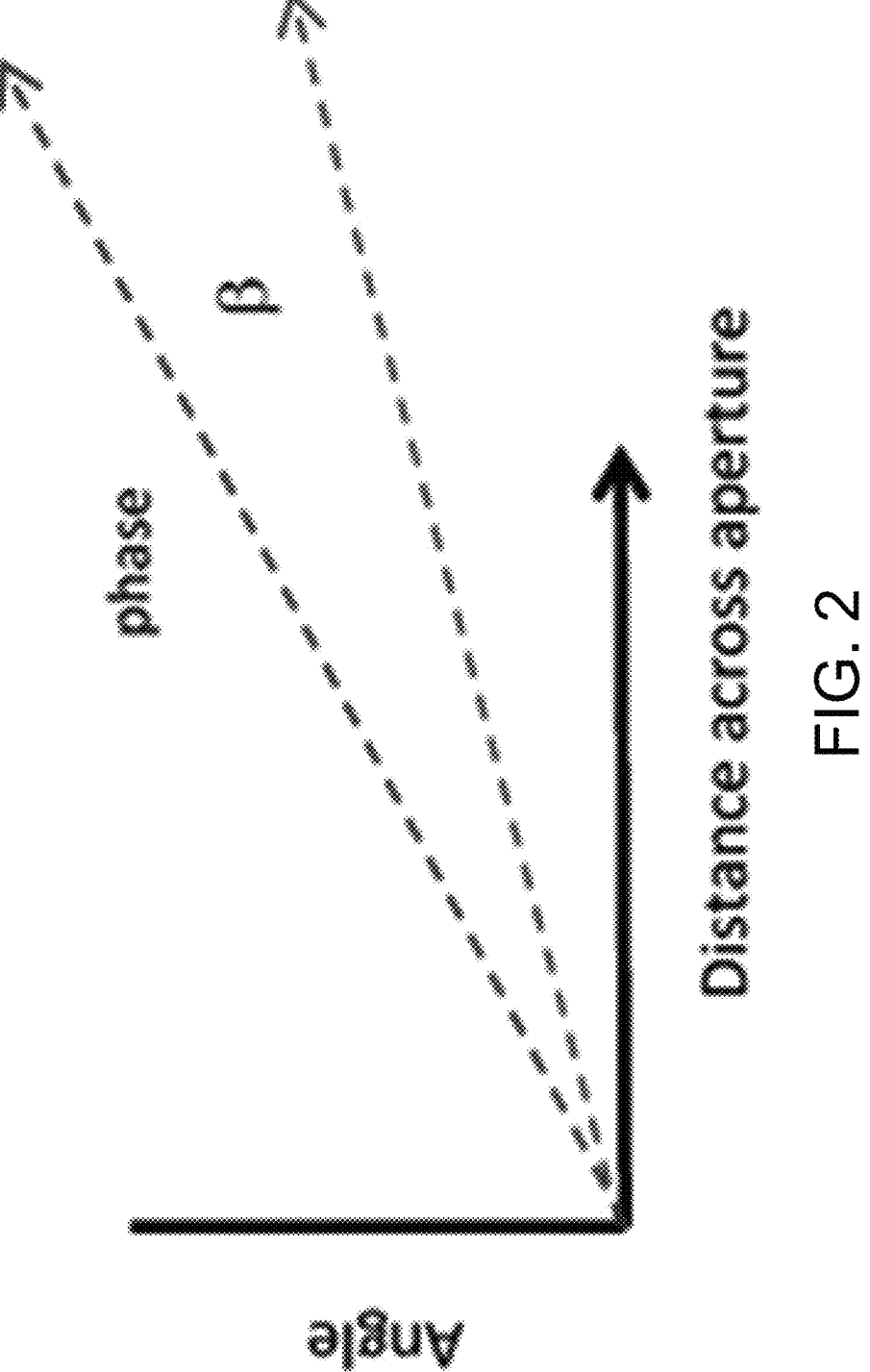
FIG. 2 is a graph showing phase profile and p angle as functions of distance across the aperture.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a non-mechanical, variable, Pancharatnam phase beam steering device.

The example device disclosed here uses an electrode structure defined below, a vertical surface alignment for the liquid crystal director, and a novel two step voltage application algorithm.

Figure 3:
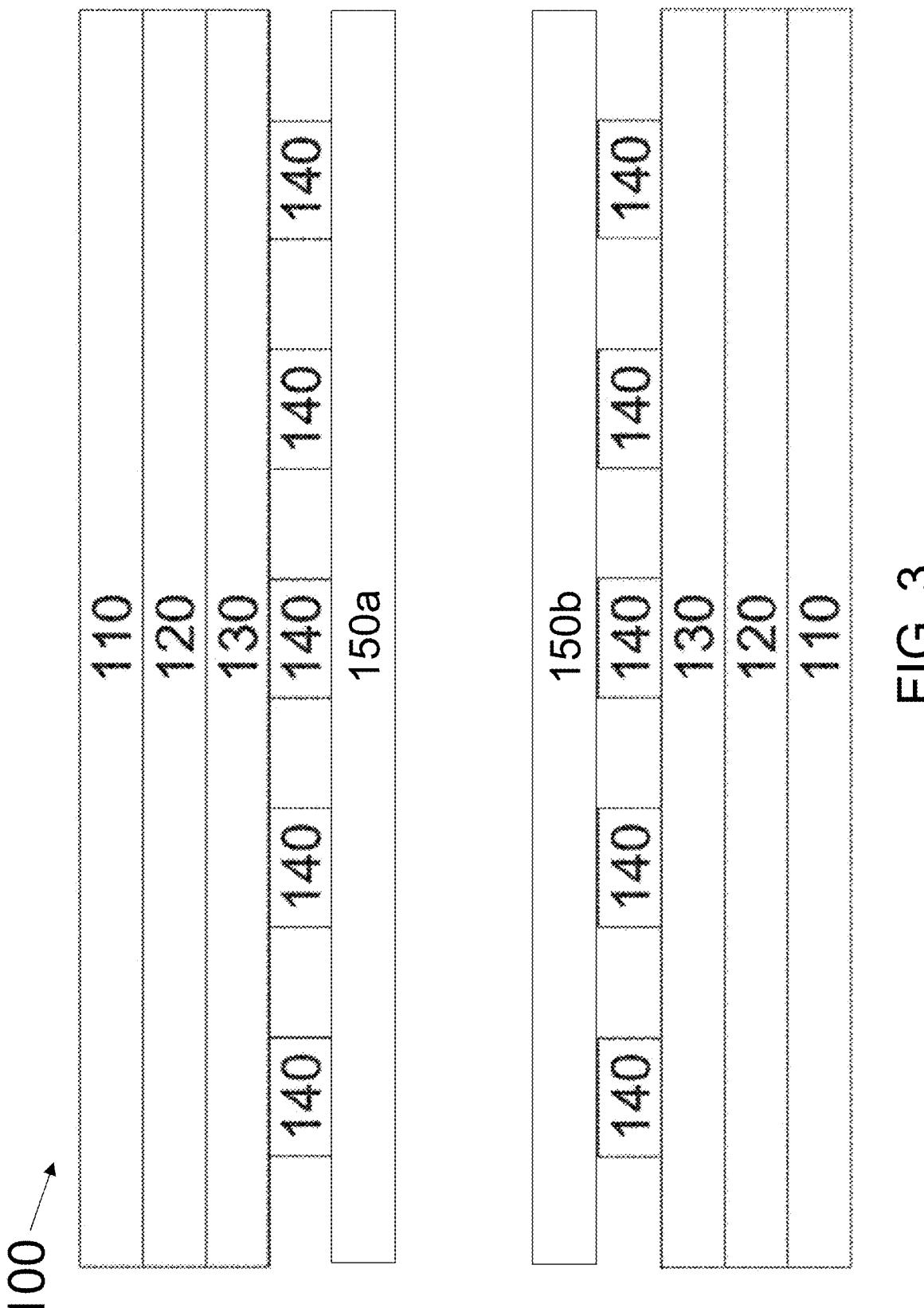
FIG. 3 is a side cross-sectional view of a device in accordance with some embodiments of the present disclosure.

FIG. 3 illustrates a general structure that may be utilized in accordance with some embodiments of the present disclosure. The device 100 includes substrates 110; common electrodes 120; common insulators 130 and individual electrodes 140 arranged in pairs (i.e., each pair includes a first electrode associated with a first side of the cell and a second electrode associated with a second, opposing side of the cell, a first alignment layer (150a) and a second alignment layer (150b). A liquid crystal composition resides in the gap between the first and second sides.

The substrates 110 may be made of glass or another transparent material.

The common electrodes 120 may be made from indium tin oxide (ITO) or another conductive and transparent material.

The insulator layers 130 may be made from silicon dioxide.

The individual electrodes 140 may be made from indium tin oxide (ITO) or another conductive and transparent material.

The alignment layers (150a) and (150b) include a thin film of materials that controls the orientation of the surface contacting liquid crystal on the top and bottom surfaces that can be made, for example, from amphiphilic molecules, a polyimide, silicon monoxide, silicon dioxide, and/or photo aligned dye molecules.

In some embodiments, the common and individual electrodes are formed from the same material.

Figure 4:
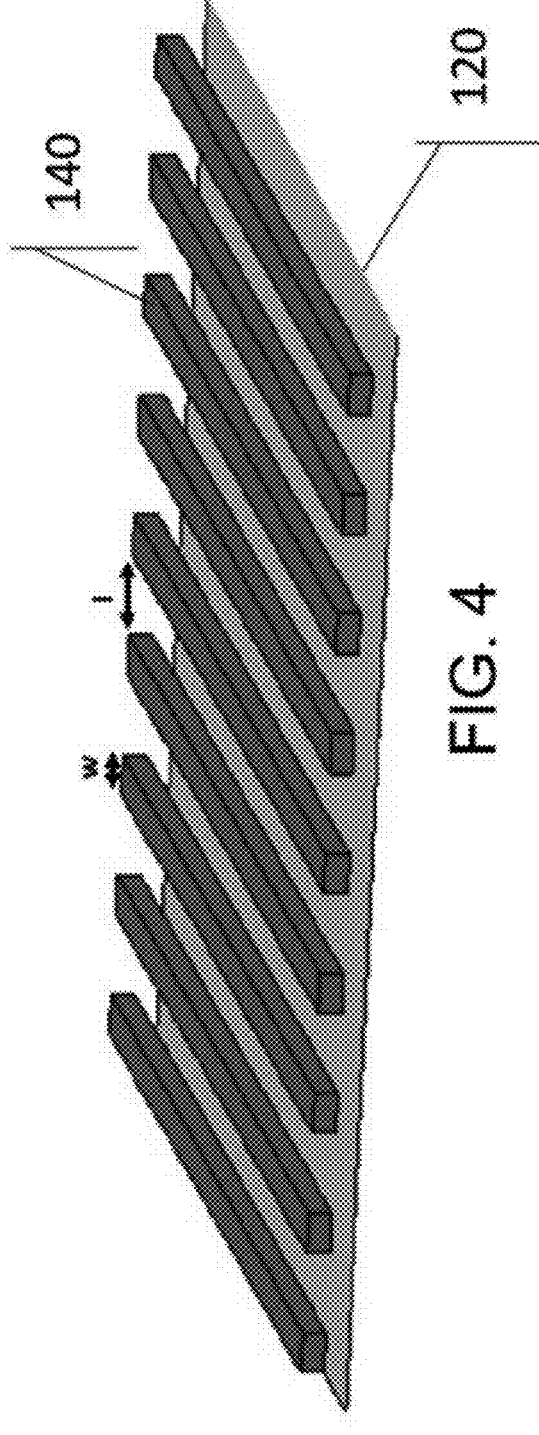
FIG. 4 is a drawing illustrating a fringe field switching structure with parallel electrodes width w and gap 1) and a common back plane in accordance with some embodiments of the present disclosure.
Figure 5:
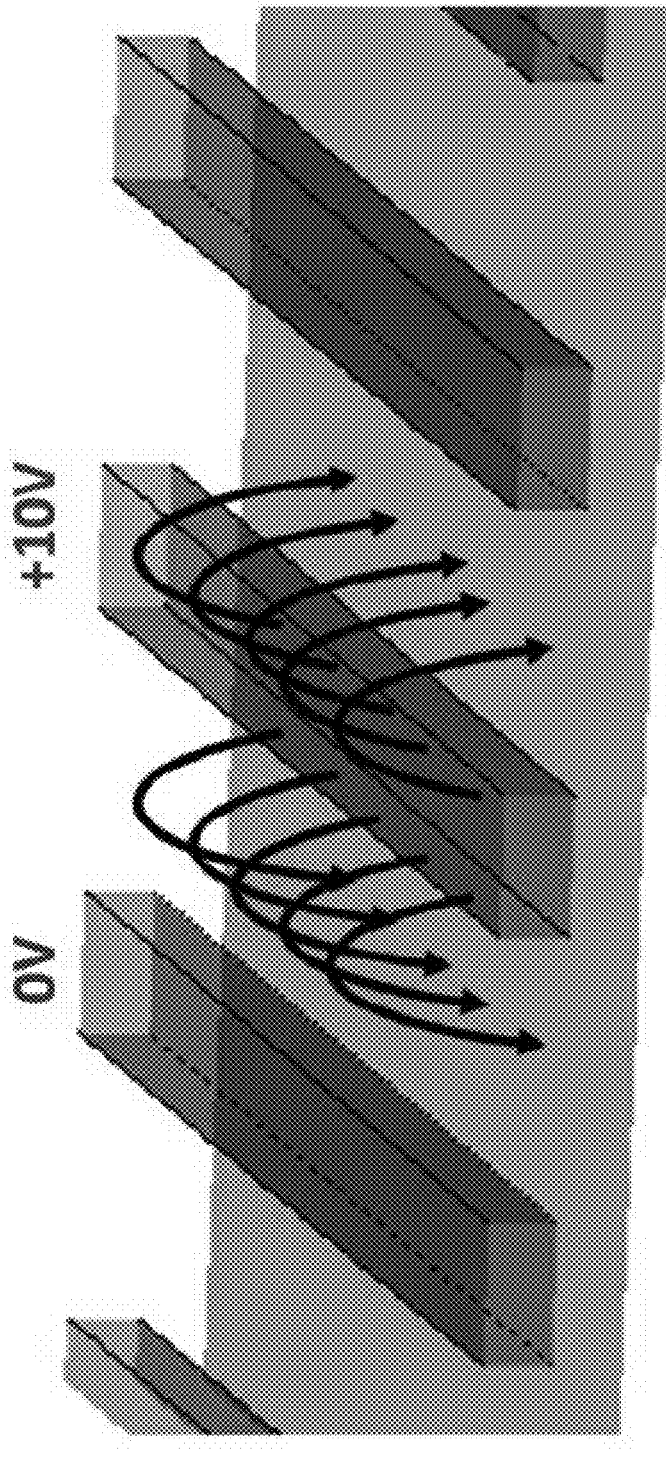
FIG. 5 is a drawing showing voltage applied to single electrode (10V) with surrounding electrodes and backplane held at 0V Fringe fields shown by black arrows (fountain shape).

The Electrode Structure:

This device takes advantage of localized in-plane electric fields that can be created by the structure defined above. This structure is an array of parallel transmissive electrodes (e.g., patterned ITO electrodes) placed above a common conductive plane (e.g., ITO) by a small distance (FIG. 4). The electrodes have a certain width (w) and gap (I) between neighboring electrodes. Applying a voltage to an electrode in this array produces fringe fields (FIG. 5) if the common plane is kept at 0V. The fringe fields take a 2D fountain-like shape as seen in FIG. 5 and provide an in-plane surface localized electric field.

Figure 6:
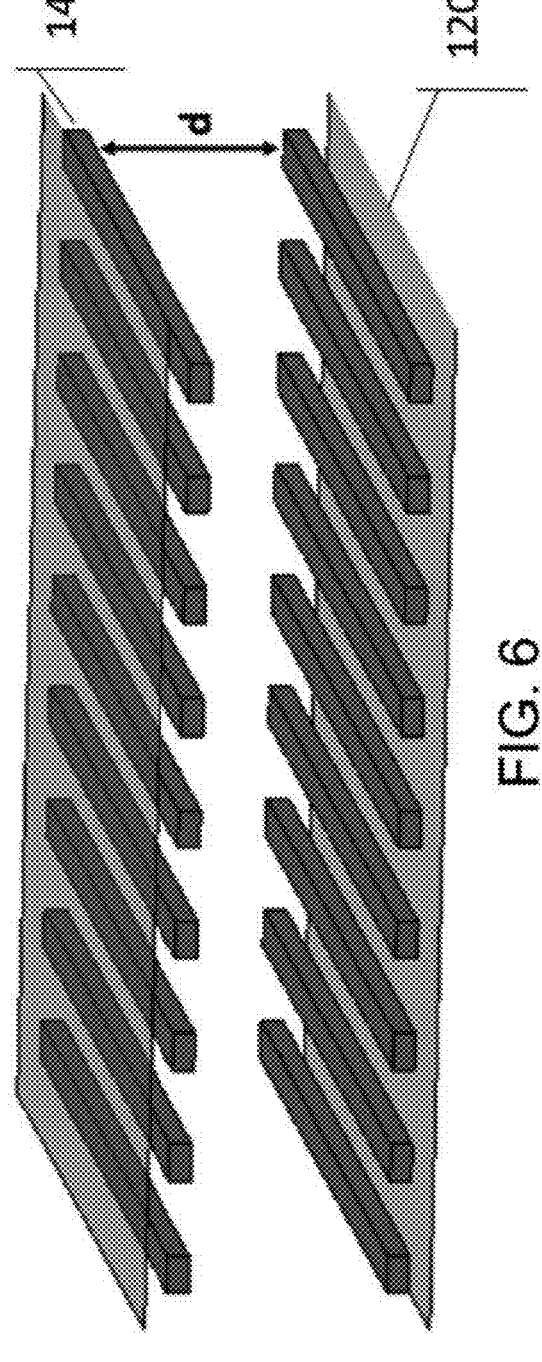
FIG. 6 is a drawing illustrating a dual surface electrode structure with cell thickness d in accordance with some embodiments of the present disclosure.

Devices of the present disclosure may utilize the same the same electrode array on both substrates with the same electrode width and spacing separated by a cell thickness d (FIG. 6). This structure requires the electrodes to be aligned approximately on top of each other.

Surface Alignment of the LC Director

Figure 7:
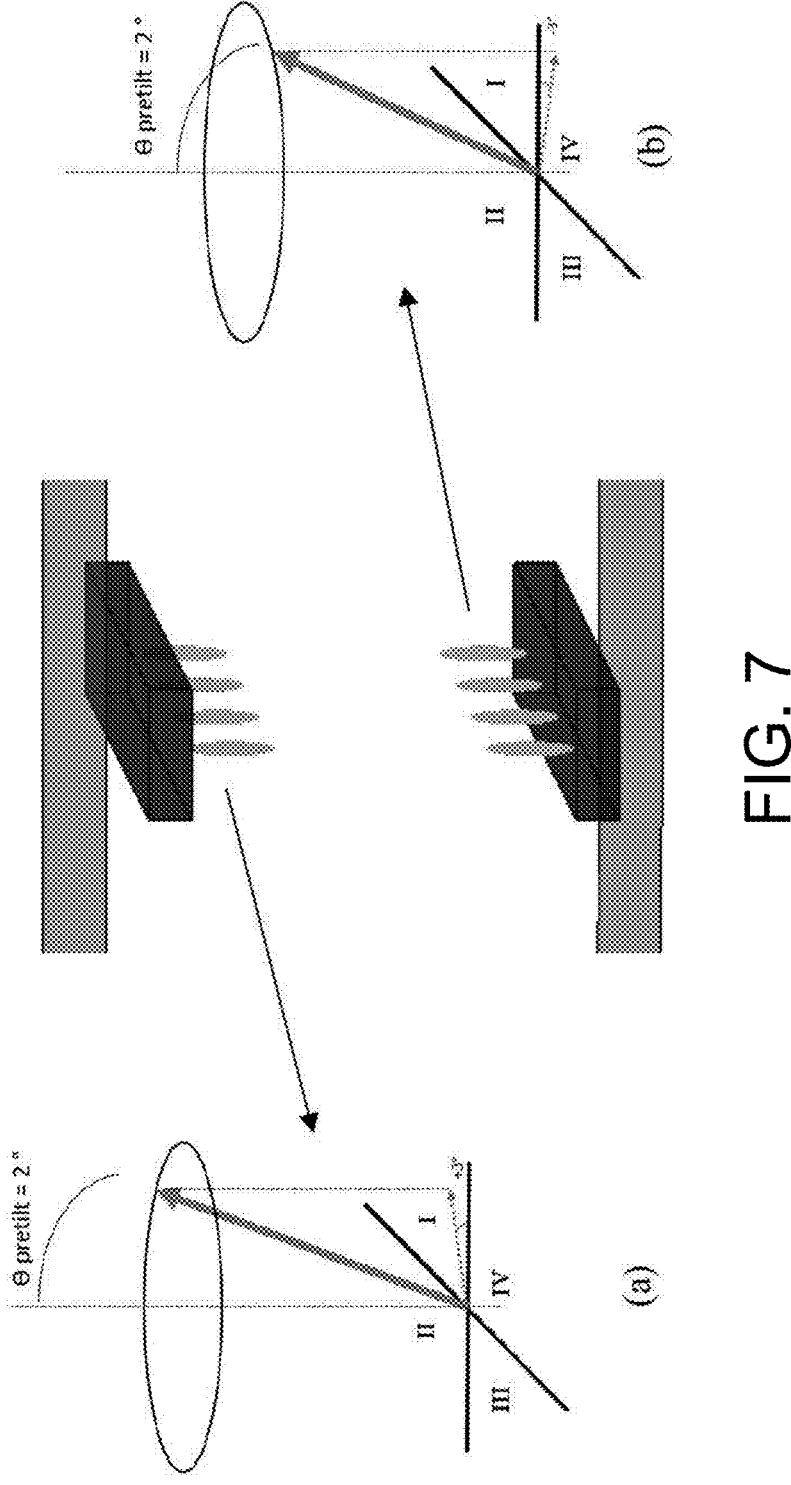
FIG. 7 illustrates initial surface alignment of LC molecule over (a) top electrodes and (b) bottom electrodes in accordance with some embodiments of the present disclosure.

In an example device, both top and bottom substrates have different alignment layers that both have a polar pretilt of 2 degrees, meaning the LC molecules are tilted 2 degrees away from vertical (FIG. 7a,b). But distinct in that the top substrate has an alignment layer that further promotes an azimuthal pretilt of +3 degrees of the surface contacting liquid crystal layer, giving it a slight preference to tilt into the +azimuthal angle direction (FIG. 7a). The bottom substrate on the other hand has an azimuthal pretilt of −3 degrees, giving the bottom surface a slight preference to tilt into the −azimuthal angle direction. These initial alignments on top and bottom substrates are crucial to the working of this vertically aligned PPD (VA-PPD).

The Novel Voltage Application Algorithm.

The most significant design innovation to achieve this VA-PPD is the original, two step voltage scheme that cooperates with the electrode structure and the surface alignment to provide unprecedented device performance. The first step has the goal of setting the azimuthal angle of the LC optic axis in the bulk, at all aperture locations, to create the linear spiral director configuration. This can be stated as saying that $\beta(x)=Cx$ where $\beta$ is the angle defined in FIG. 1, C is a constant and x is the distance across the aperture. The second step in the voltage application is to cause the director to lie in the plane of the cell. As the liquid crystal material used has a negative dielectric anisotropy that causes the director to align perpendicular to the electric field direction, the second voltage step provides a strong vertical field to tilt all the LC molecules into the plane of the device.

Figure 8:
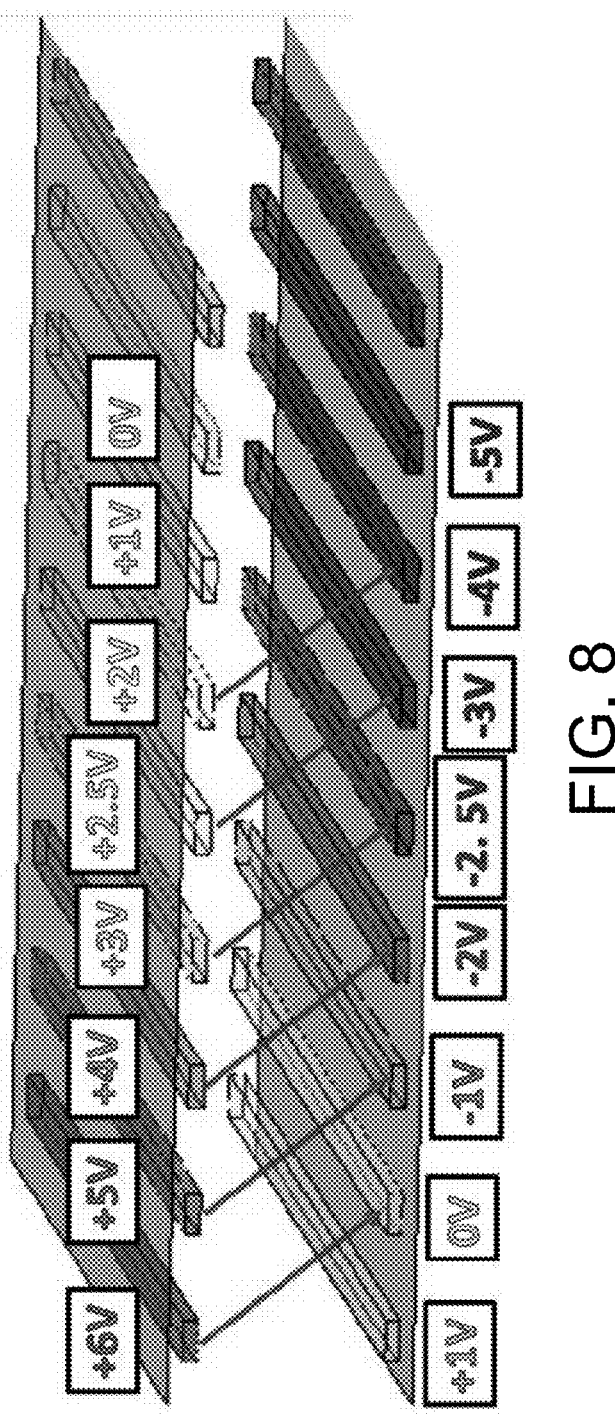
FIG. 8 illustrates a non-limiting example of applied voltage for step one showing formation of "diagonal fields."

Step 1 voltage: The voltage scheme has two key components, localized in-plane electric fields discussed earlier, and "diagonal fields" in LC bulk (FIG. 8).

Figure 10:
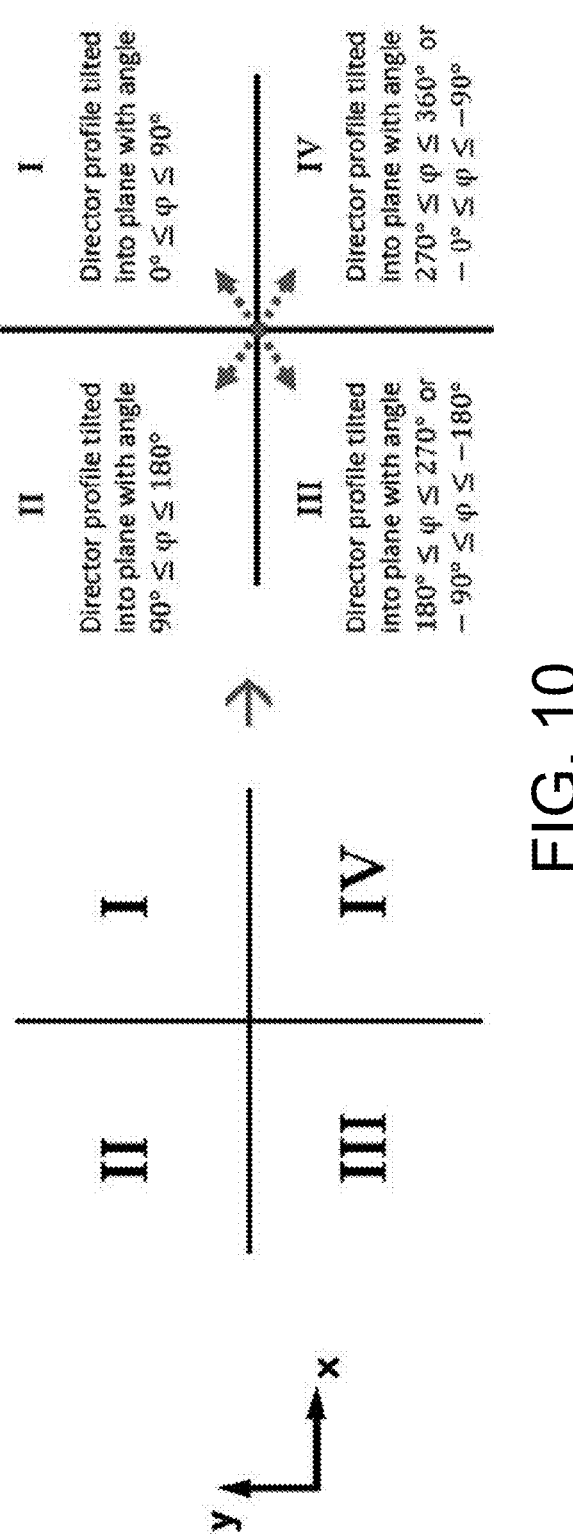
FIG. 10 illustrates four in-plane quadrants that LC molecule can be tilted into starting from near vertical alignment.

The in-plane fields, caused by the fringing fields on the surface of the device around individual electrodes, twist the LC molecule toward the + or −90 degrees azimuthal angle depending on whether the fields are produced on the top or bottom substrate. If the surface fringing fields around the electrodes on the top surface are of greater strength as those on the bottom surface, the director will tend to be in quadrants I and II in FIG. 10. If the surface fringing fields around the electrodes on the bottom surface are of greater strength as those on the top surface, the director will tend to be in quadrants III and IV in FIG. 10. The diagonal fields in the bulk then tilt the LC molecules to the left or right. That is increase the director polar angle, with azimuthal angles of 180° or 0°, as determined by the tilt of the equipotential lines in the bulk of the cell. The effect is to cause the director to tend to be in quadrants I and IV or II and III in FIG. 10. The combined effect of the surface fringing fields and the bulk diagonal fields, cause the director to tend to be in only one of the four quadrants of FIG. 10.

Figure 9:
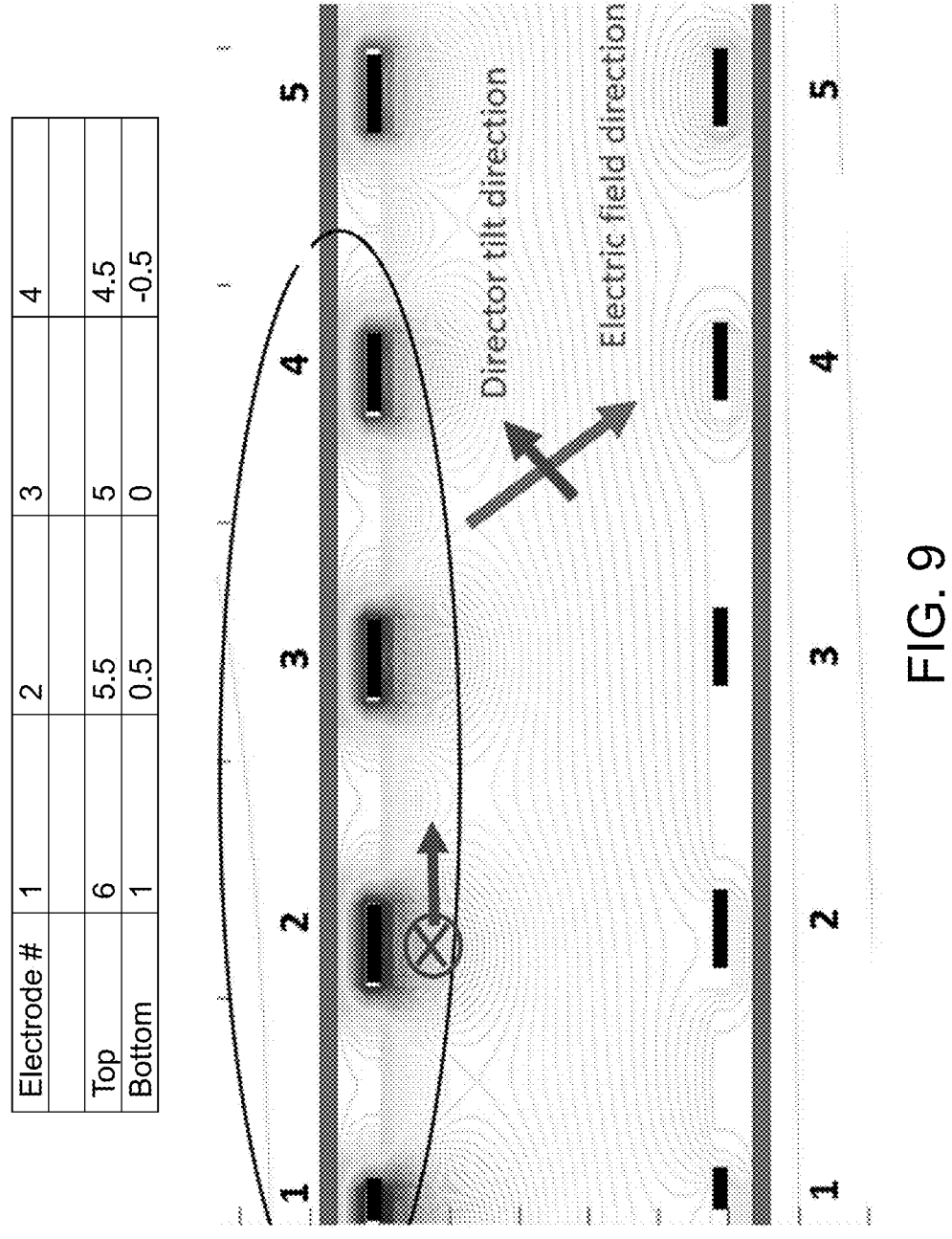
FIG. 9 illustrates example electrode voltages showing surface localization and bulk diagonal electric fields. The blue horizontal lines are the common electrodes on the top and bottom surface, that in this case are assumed to be at zero volts. The black horizontal lines show the width of the patterned electrodes whose long axis is perpendicular to the plane of the drawing. The voltages on the patterned electrodes in this example are shown in the table. The curved lines are the equal-potential lines (that are perpendicular to the electric field direction). The blue arrows show the electric field direction near the top surface and in the bulk of the LC layer. The electric field near the top surface causes the director to rotate to be perpendicular to the plane of the drawing (tail of arrow shown in red), and the field in the bulk cause the director to tilt to the right as shown by the red arrow. Note that the in-plane surface localized fields in this example are much larger on the top surface relative to the bottom surface.

As an example, FIG. 9 shows equipotential lines for the voltages shown in the table.

In FIG. 9, the blue horizontal lines are the common electrodes on the top and bottom surface, that in this case are assumed to be at zero volts. The black horizontal lines show the width of the patterned electrodes whose long axis is perpendicular to the plane of the drawing. The voltages on the patterned electrodes in this example are shown in the table. The curved lines are the equal-potential lines (that are perpendicular to the electric field direction). The blue arrows in FIG. 9 show the electric field direction near the top surface and in the bulk of the LC layer. The electric field near the top surface causes the director to rotate to be perpendicular to the plane of the drawing (tail of arrow shown in red), and the field in the bulk causes the director to tilt to the right as shown by the red arrow. Note that the in-plane surface localized fields in this example are much larger on the top surface relative to the bottom surface.

The diagonal fields in the bulk are caused by the relation of the voltages from one electrode to the next on each surface. A detailed, non-limiting example of the relation of these voltages is provided below.

Figure 11:
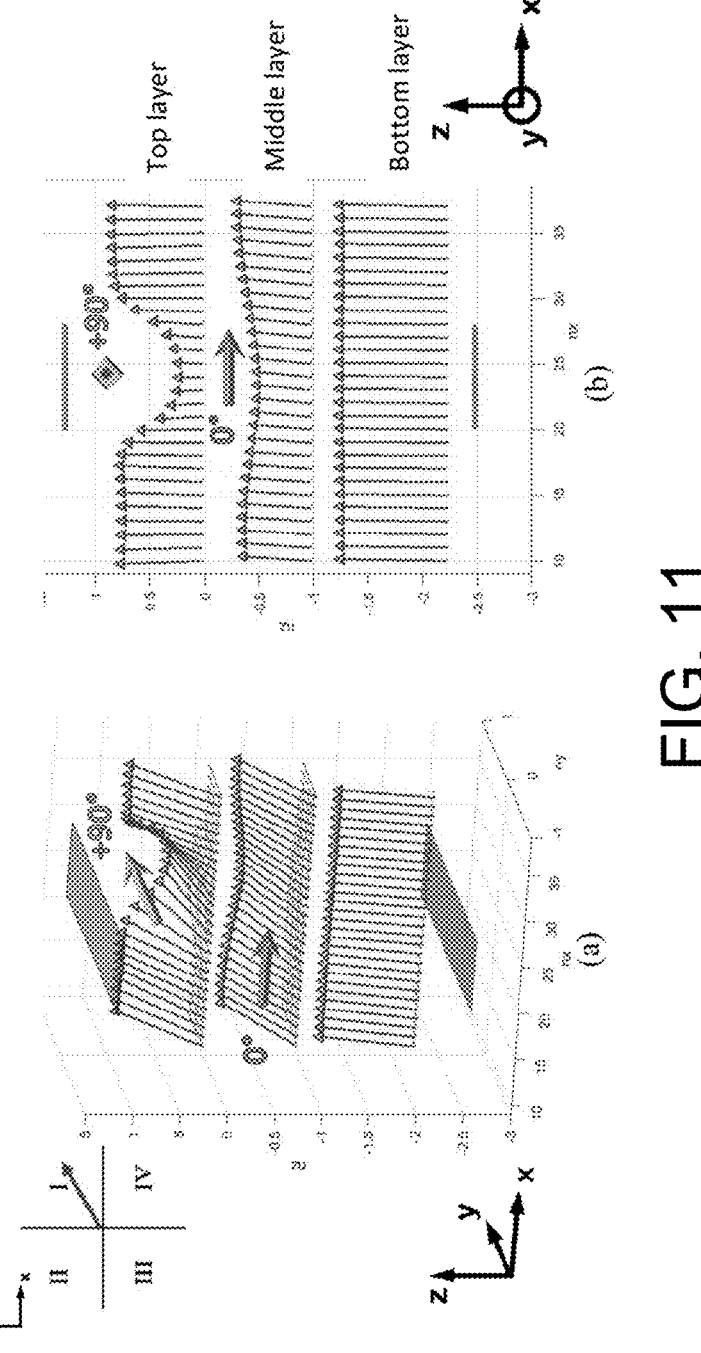
FIG. 11 illustrates aspects related to tilting into quadrant I. The blue arrow shows the direction of director tilt caused by the combined effects of the in plane localized fields and the director surface alignment on the top surface. The green arrow shows the direction of director tilt caused by the bulk diagonal fields.

In order to drop the LC molecule into quadrant I, in-plane surface localized electric fields need to be strongest on the top surface where the effect of the in plane field and the top alignment layer causes the liquid crystal to tilt toward the +90 degree azimuthal direction, and the diagonal fields causes the liquid crystal to tilt the bulk towards the 0-degree direction with the combined synergistic effects causing the liquid crystal to tilt into the desired quadrant (FIG. 11).

Figure 12:
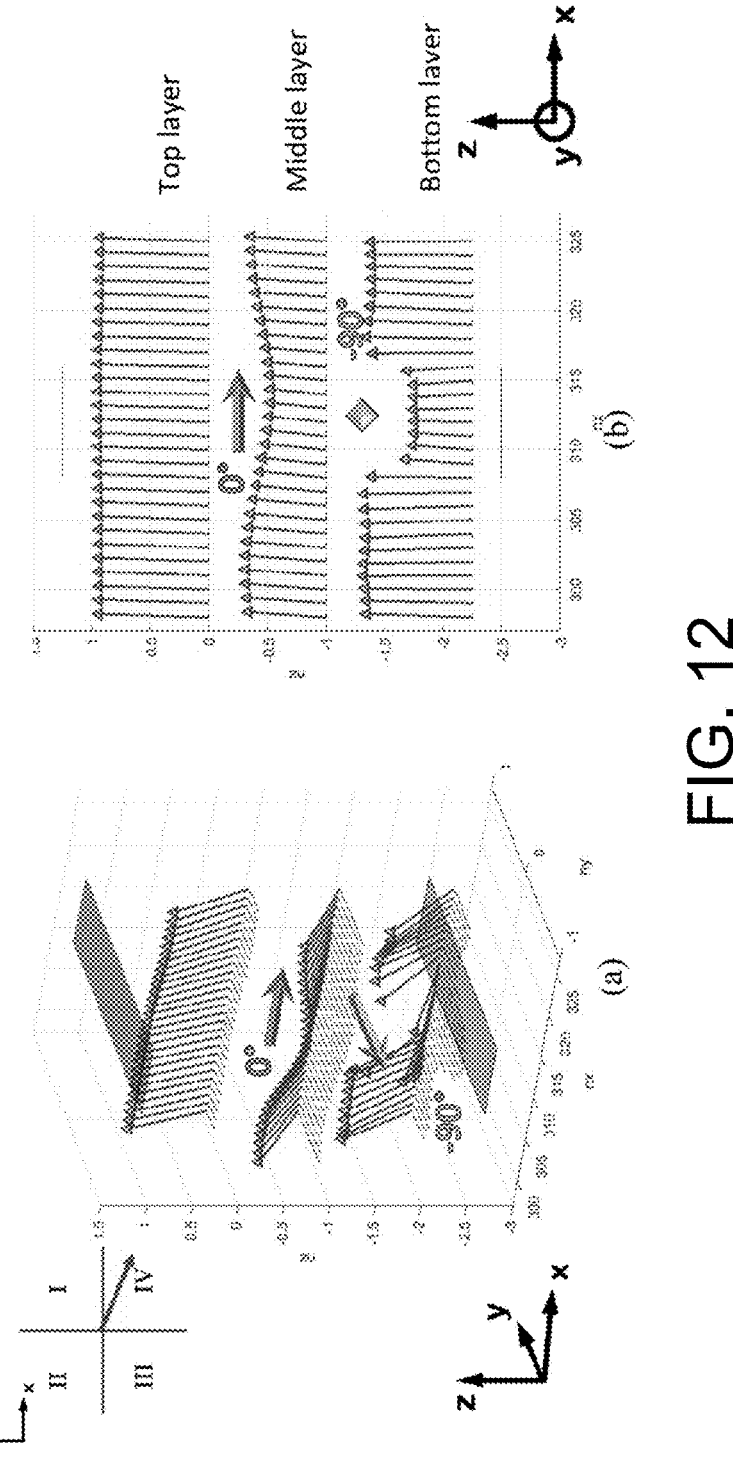
FIG. 12 illustrates aspects related to tilting into quadrant IV. The blue arrow shows the direction of director tilt caused by the combined effects of the in plane localized fields and the director surface alignment on the top surface. The green arrow shows the direction of director tilt caused by the bulk diagonal fields.

In order to drop the LC molecule into quadrant IV, the surface localized in-plane electric fields need to be strongest on the bottom surface where the effect of the in plane electric field and the bottom alignment layer causes the liquid crystal to tilt towards the −90 degree azimuthal direction, and the diagonal fields causes the liquid crystal to tilt the bulk towards the 0-degree direction with the combined synergistic effects causing the liquid crystal to tilt into the desired quadrant (FIG. 12).

Figure 13:
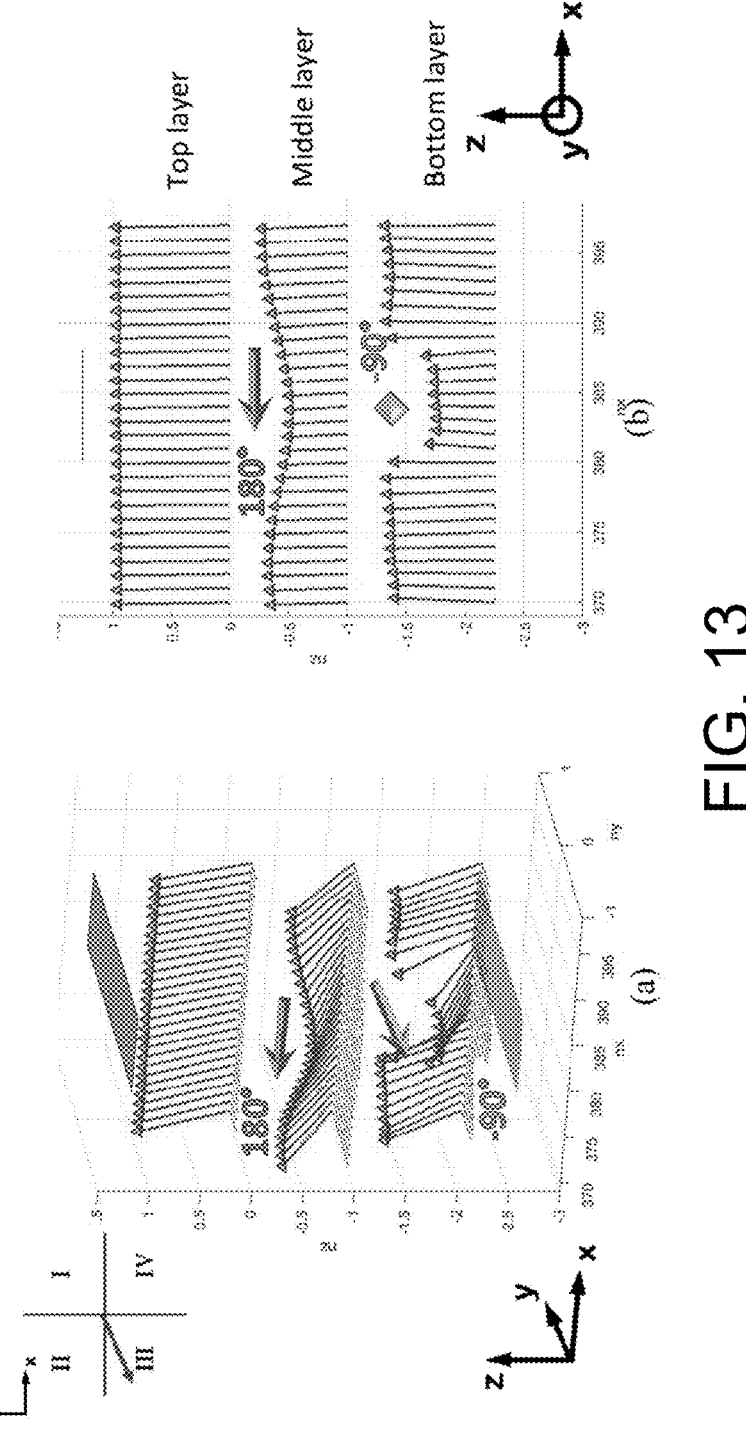
FIG. 13 illustrates aspects related to tilting into quadrant II. The blue arrow shows the direction of director tilt caused by the combined effects of the in plane localized fields and the director surface alignment on the top surface. The green arrow shows the direction of director tilt caused by the bulk diagonal fields.

In order to drop the LC molecule into quadrant III, the in-plane surface localized fields need to be strongest on the bottom surface where the effect of the electric field and the bottom alignment layer causes the liquid crystal to tilt towards the −90 degree azimuthal direction, and the diagonal fields causes the liquid crystal to tilt the bulk towards the 180-degree direction with the combined synergistic effects causing the liquid crystal to tilt into the desired quadrant (FIG. 13).

Figure 14:
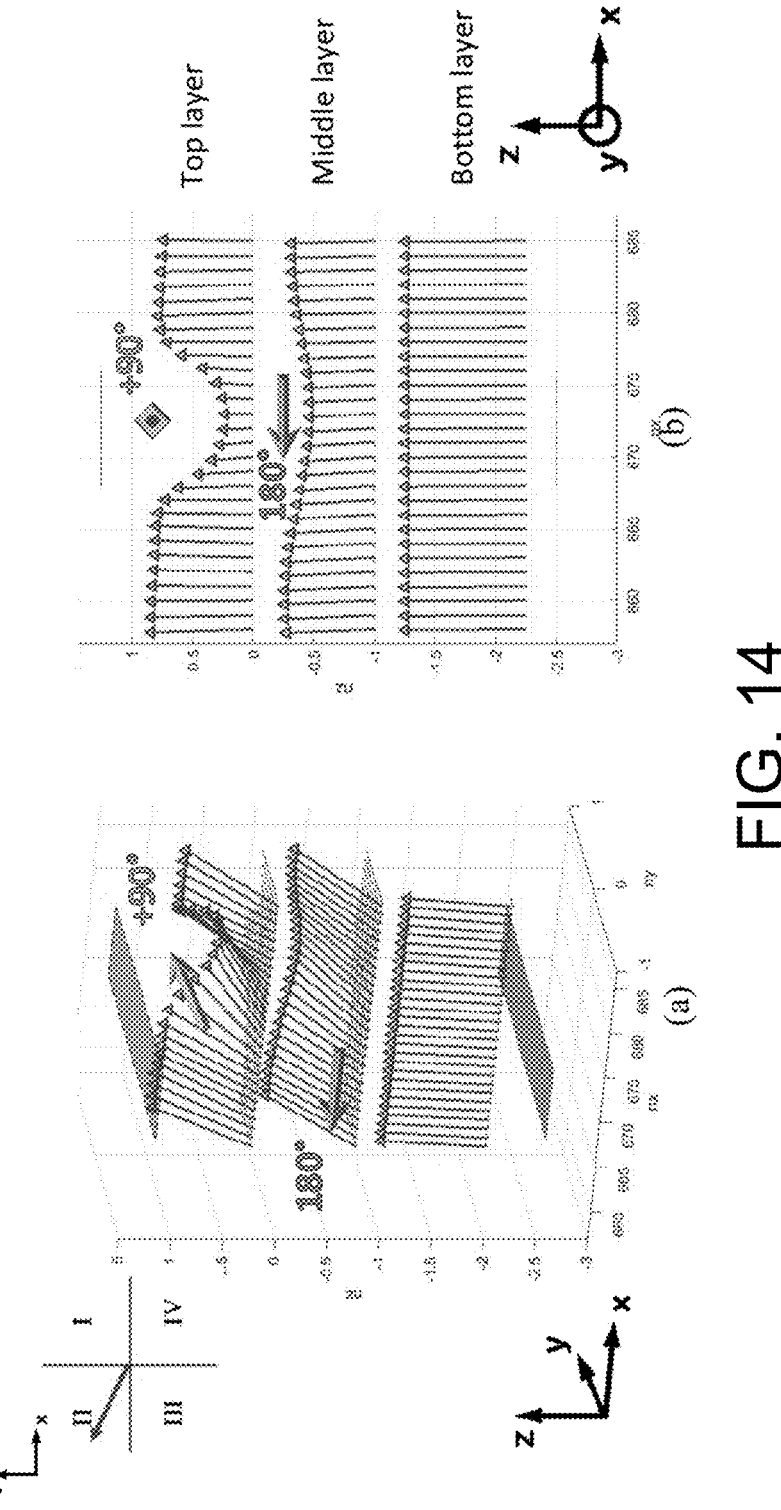
FIG. 14 illustrates aspects related to tilting into quadrant II. The blue arrow shows the direction of director tilt caused by the combined effects of the in plane localized fields and the director surface alignment on the top surface. The green arrow shows the direction of director tilt caused by the bulk diagonal fields.

In order to drop the LC molecule into quadrant II, the in-plane electric fields need to be strongest on the top surface where the effect of the electric field and the top alignment layer causes the liquid crystal to tilt towards the +90 degree azimuthal) direction, and the diagonal fields causes the liquid crystal to tilt the bulk towards the 180-degree direction with the combined synergistic effects causing the liquid crystal to tilt into the desired quadrant (FIG. 14).

Figure 15:
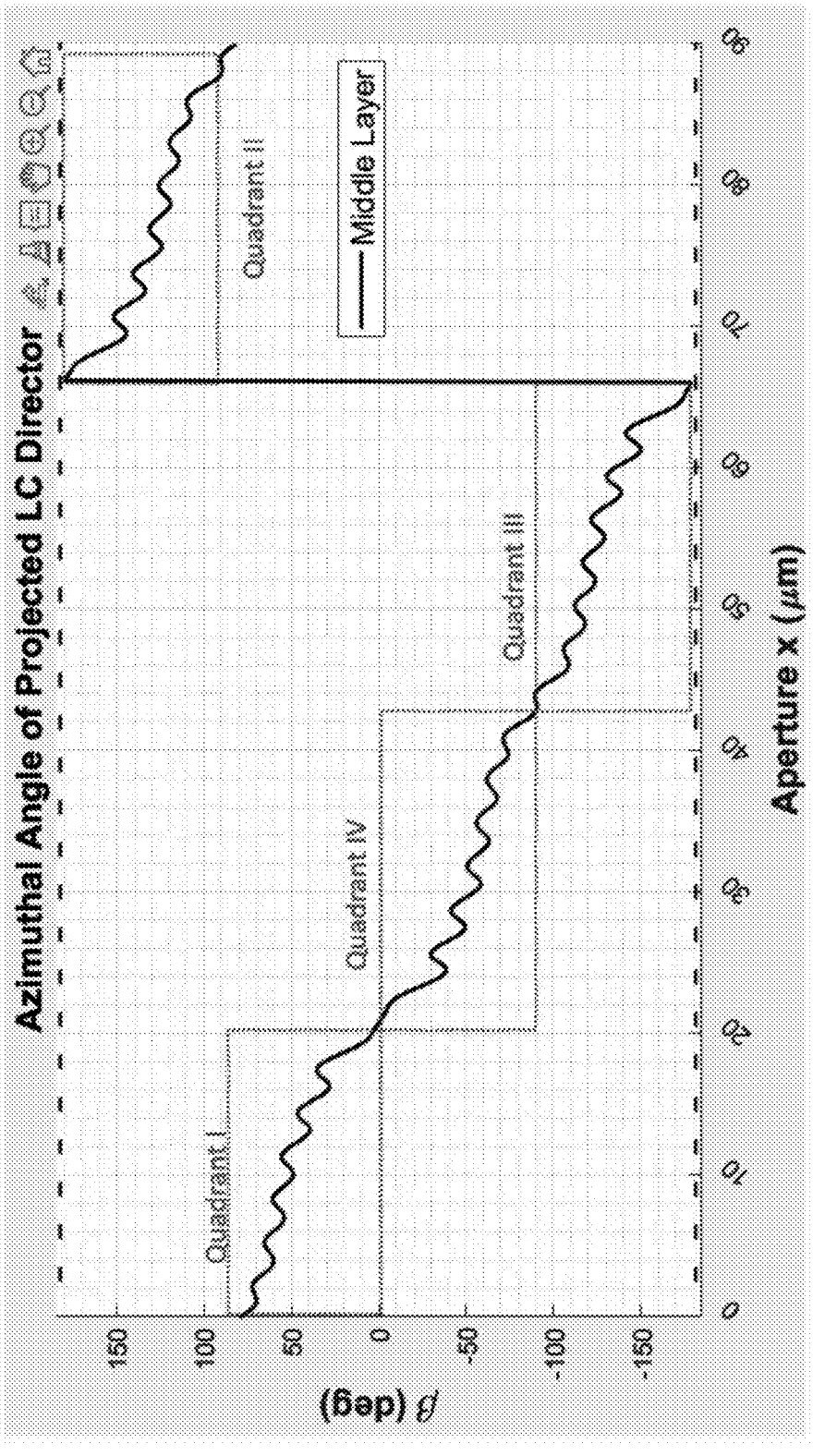
FIG. 15 is a graph illustrating LC molecule in-plane azimuthal angle ($\beta$) as a function of aperture (x) resulting from the step one voltages, forming a complete linear spiral pattern.

By carefully choosing the proper surface localized in-plane electric field and bulk diagonal field values across the aperture, the step one voltages can accurately produce the linear spiral pattern needed for high performance steering (FIG. 15).

Figure 16:
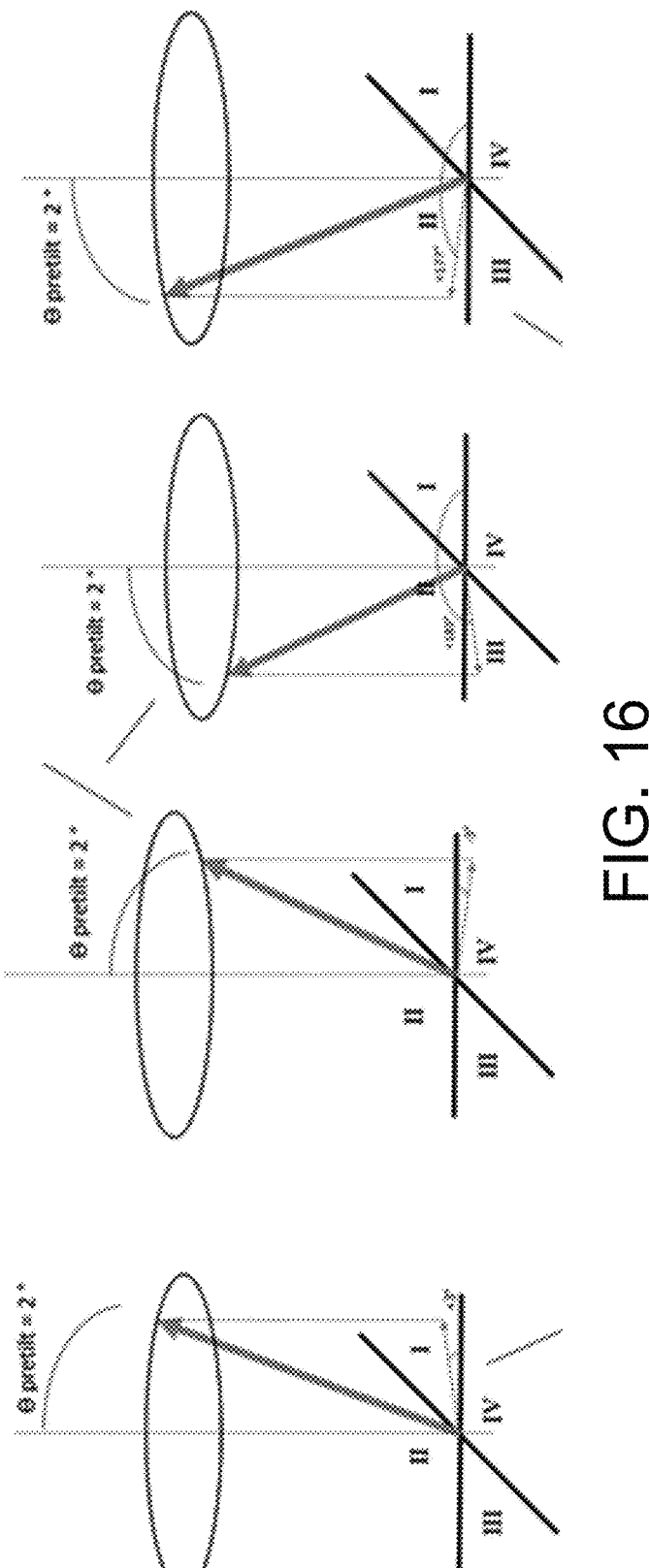
FIG. 16 is a 3D view of LC director with azimuthal angle $\beta$ in each corresponding quadrant.

FIG. 16 is a 3D view of the LC director with azimuthal angle β in each corresponding quadrant.

Step 2 Voltage

The second voltage step can be simply a strong vertical field with no fringe fields. The top common plane is set at 10V along with all top electrodes, while the bottom common plane and bottom electrodes are set to 0V (FIG. 16). The spiral pattern in LC molecules in the bulk is set in the step one, so step two ensures all molecules are tilted into the plane of the cell. Any uniformities in the spiral pattern from step one can be resolved by elastic energies after all molecules are in the plane of the device. The speed of this device is a large improvement on the previous homeotropic device (VCOPA), on the order of tens of milliseconds, and this device has been shown to work or both long and short spiral pitches. However, it should be noted that it may be beneficial to apply surface localized in-plane fields in step 2 to further improve the speed and to fine tune the desired spiral director profile.

Figure 18:
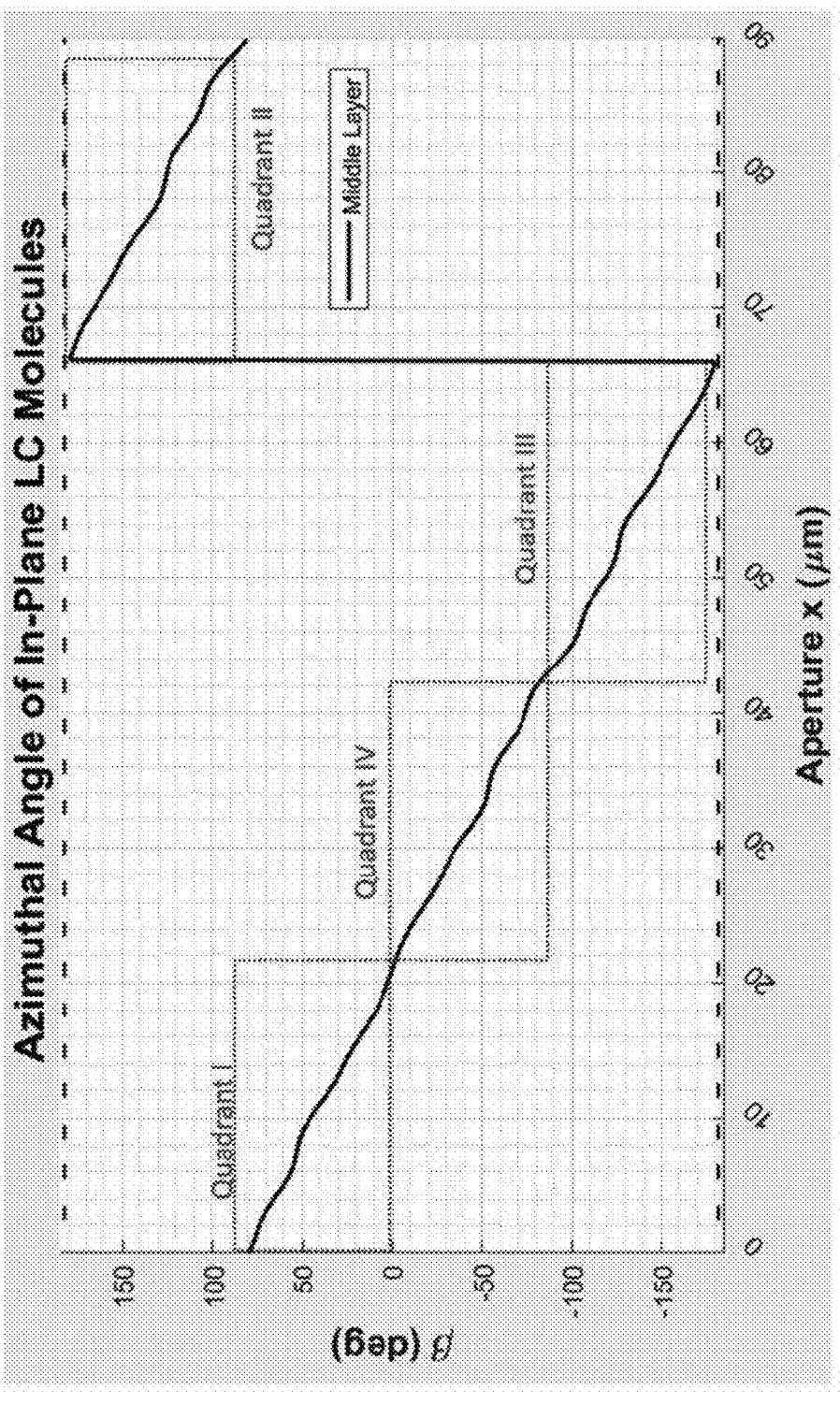
FIG. 18 illustrates azimuthal angle ($\beta$) vs aperture (x) after step two voltage applied. The angle beta is shown modulo 360 degrees to make the graph compact. The angle beta has no discontinuous jumps as might be implied by the figure.

FIG. 18 illustrates azimuthal angle (β) versus aperture (x) after two step voltages applied.

Figure 19:
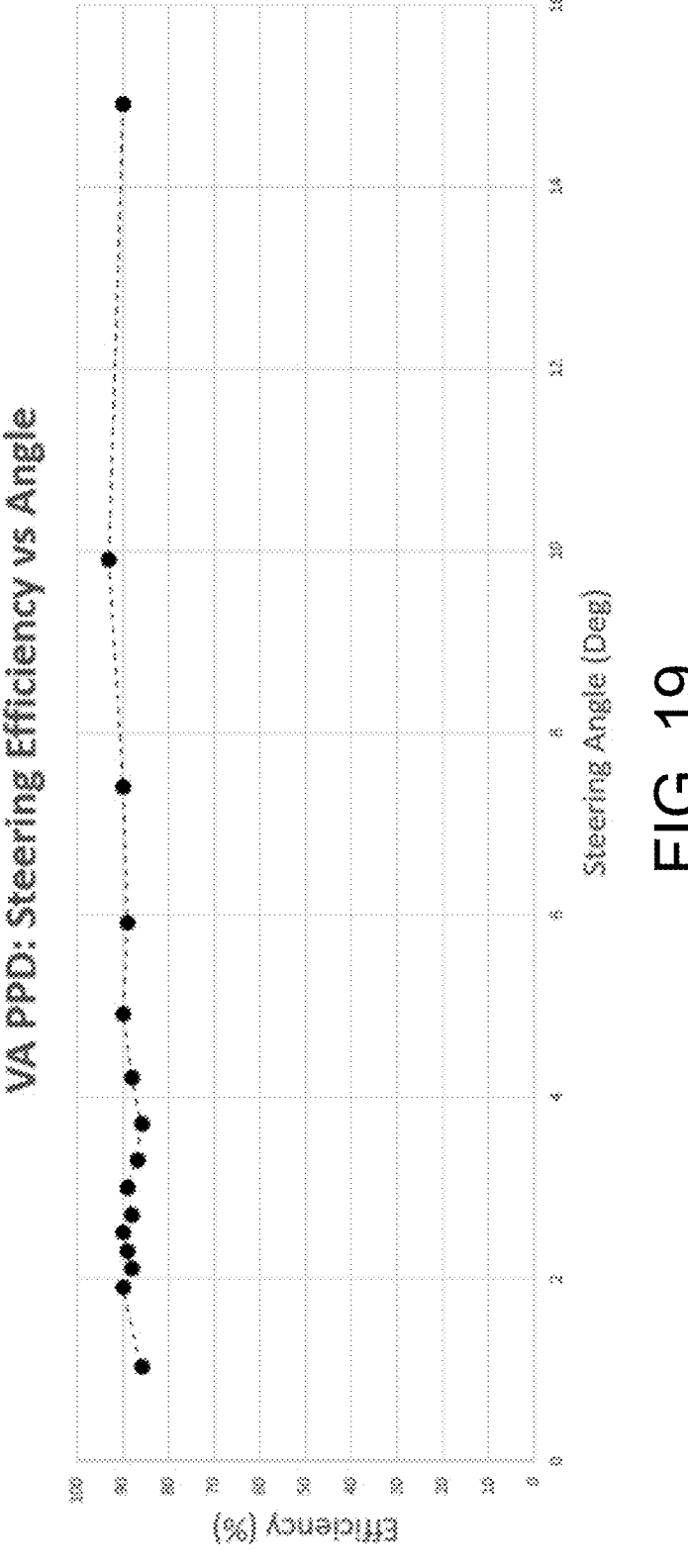
FIG. 19 is a graph showing Beam steering efficiencies for angles spanning 1-15 degrees.

FIG. 19 illustrates beam steering efficiencies of angles spanning 1 to 15 degrees.

Step 1 Voltage

In FIG. 9, the plurality of electrodes on each surface is fabricated on a substrate that has a first layer consisting of a common electrode, a second layer consisting of an insulator, and the third layer that contains the plurality of electrodes. It is also assumed that the common electrodes in step 1 are both at a common reference potential (zero volts in this example). It gives the basic idea of the voltages applied, but it is not for one complete cycle (i.e., a 360° rotation of the director about the layer normal) and does not attempt to define equations to specify the voltages.

Figure 20:
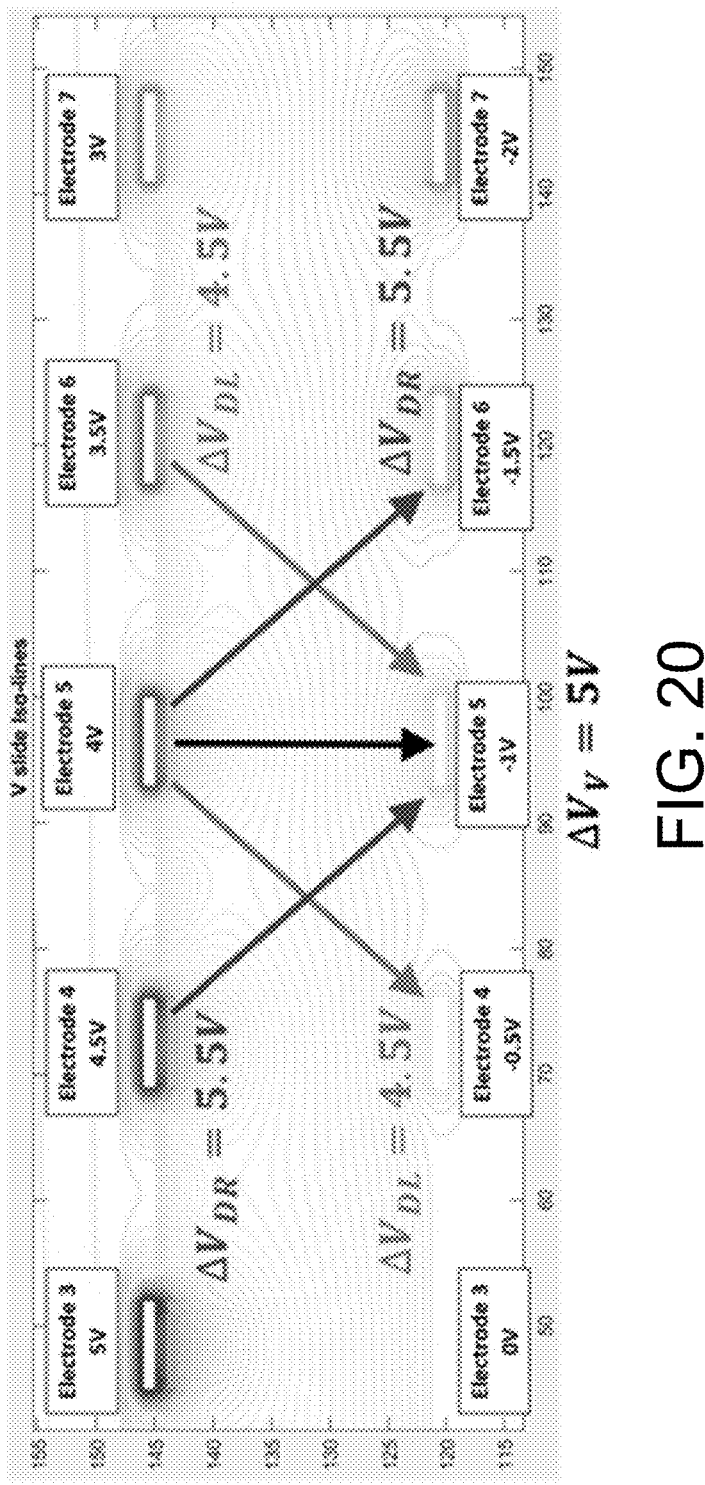
FIG. 20 illustrates a non-limiting example of applied voltages. The first row gives reference electrode numbers, the second row gives example voltages applied to a region of the plurality of electrodes on the top surface, and the third row gives example voltages applied to the plurality of electrodes on the bottom surface. The roman numerals show which quadrant (defined in FIGS. 10-16) the director tips into as a result of these voltages.

FIG. 20 shows another example of the equipotential lines resulting from the voltages shown on the electrodes. In this figure it is made clear that for the voltages chosen the diagonal fields on either side of electrodes 5 have a different magnitude. The field to the right results from a potential difference of 5.5 volts, while the field to the left results from a potential difference of 4.5 volts. In general, by using both voltage components and the surface alignment in tandem, the LC molecule can be dropped into one of four quadrants (FIGS. 10-16) to construct the spiral pattern The table of FIG. 21 generalizes the voltages applied to the plurality of electrodes on the top and bottom substrate in FIG. 20. The top row gives the electrode number, the middle row gives example voltages applied to the electrodes on the top surface, and the bottom row example voltages applied to the electrodes on the bottom surface. As in FIG. 9, the voltages on the top surface electrodes is continuously decreasing (starting from 6 volts on the left hand side) until the value of zero is reached, and then it is continuously increasing up to the starting voltage again (after electrode 14 on the right side, the sequence repeats starting with electrode number 1 again). It is also noted that the difference in the voltage applied to each electrode number on the top and bottom substrates is here the same value of a constant magnitude (here 5 volts).

As explained above, it has been found that voltage with these characteristics, when coupled with the defined alignment layer, cause the director to form a spiral structure as shown in FIG. 1.

Figure 21:
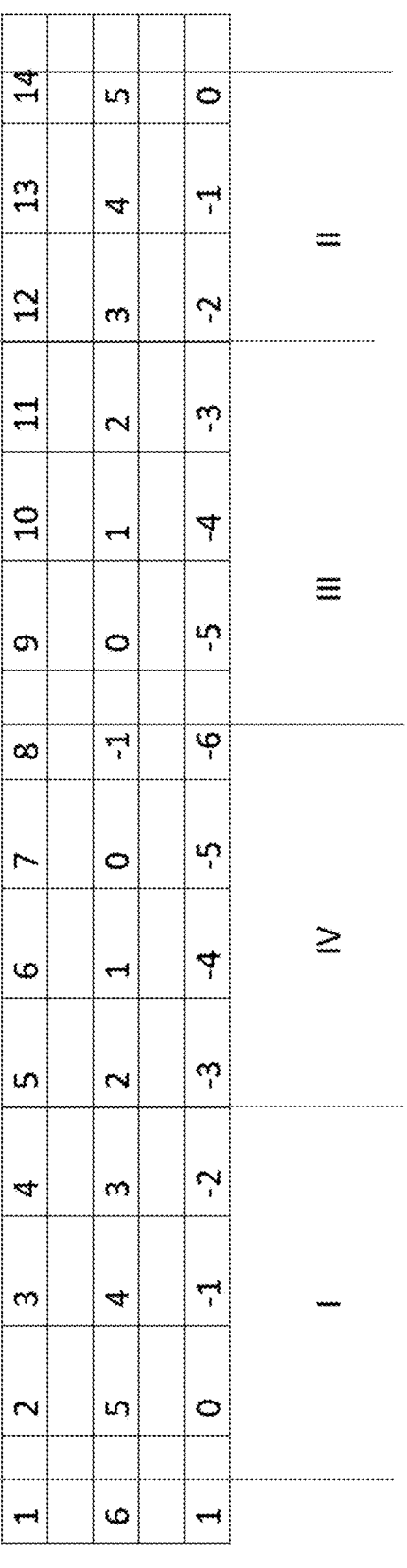
FIG. 21 is a table generalizing the voltages applied to the plurality of electrodes on the top and bottom substrate in FIG. 20.

FIG. 21 provides a non-limiting example of a step 1 voltage profile on 14 electrodes to cause a full 360° director rotation in the plane of the device. The roman numerals correspond to the quadrant that director occupies as defined above.

The idea is to provide a diagonal field sufficient to tilt the director without a vertical field being so strong as to force the director fully into the plane of the cell. In this case it is assumed that the 5-volt vertical potential difference is insufficient to drive the director into the plane of the cell, but the 6-volt difference between off-set electrodes on the two substrates is sufficient to cause the director to tilt as desired. Note that subtracting or adding any value to all of the voltages as no effect on the bulk inter-substrate electric fields but will increase or decrease the in-plane surface localized fields caused by the changed potential difference between the grounded common planes.

The voltages can be defined relative to zero volts applied to the common electrodes, of the top electrodes as $V_{top}(i)$ and on the bottom as $V_{bottom}(i)$. wherein i is the number of the electrode from one edge. Then:

The vertical field is $V_{vertical}=|V_{top}(i)-V_{bottom}(i)|$ and should not be so great as to force the direction totally in the plane of the device (say an approximate 45° angle to the surface).

The diagonal field $V_{diagonal}=$ the greater of: $|V_{top}(i)-V_{bottom}(i+1)|$ or $|V_{top}(i)-V_{bottom}(i-1)|$ should be sufficient to tilt the director through the LC layer. And in cooperation with the surface alignment condition, cause the director to tilt into quadrants I, IV, III, or II.

The local in plane field $V_{horizontal}=V_{top}(i)$ on the top surface and $V_{bottom}(i)$ on the bottom (relative to the common electrodes that are assumed to be zero). This will be dependent on the electrode number, i, and the if the highest value of $V_{top}(i)$ or $V_{bottom}(i)$ is $V_{max}$, (6 volts in FIG. 21), then must have $V_{max}/2$ is sufficient to set the azimuthal angle in a positive or negative rotational sense about the layer normal.

Figure 17:
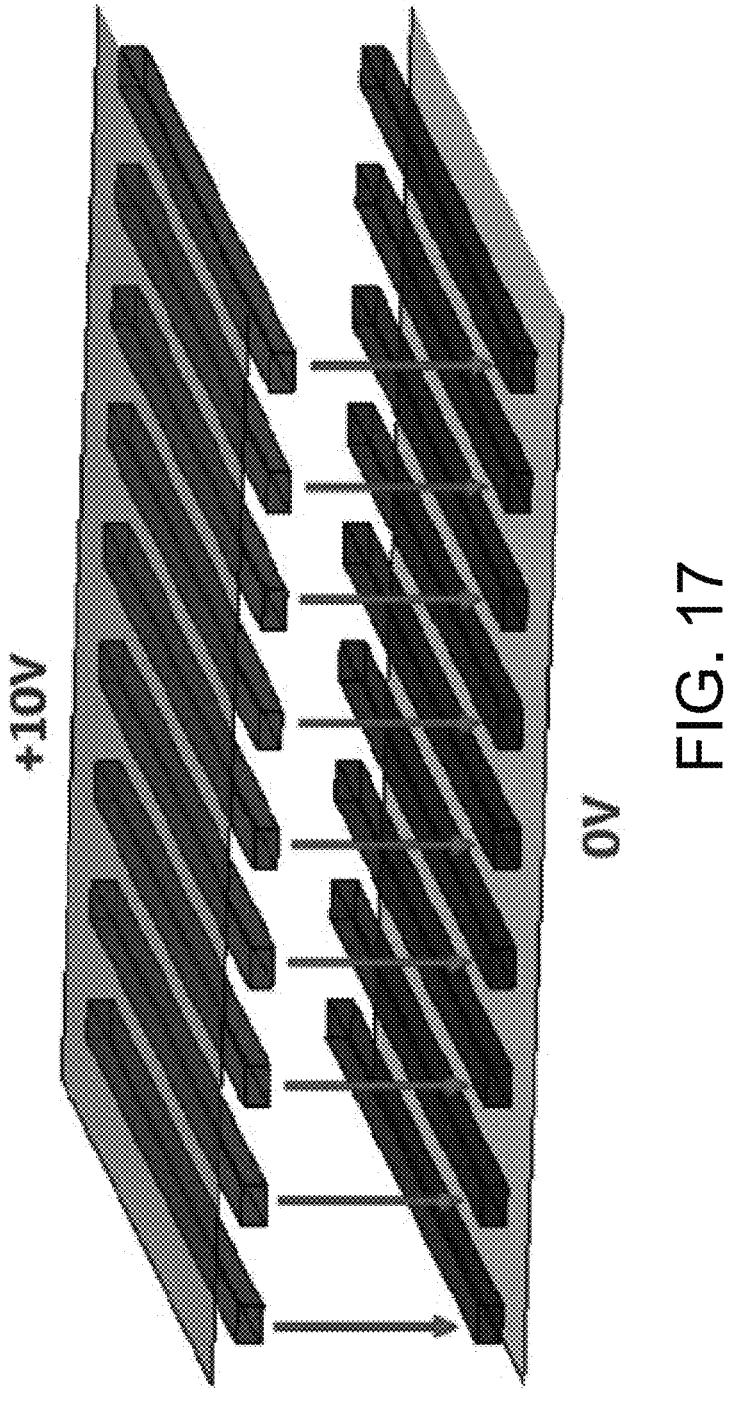
FIG. 17 illustrates Step two voltage with top common plane and all top electrodes set at 10V all bottom electrodes and common plane set at 0V.

In the second voltage step the voltages applied to the common planes on the two surfaces are not equal, but different enough so that the director is forced to be in the plane of the substrates that voltage is here called $V_{topCommonStep2}$. relative to the voltage applied to the bottom common electrode. $V_{topCommonStep2}$ is 10 volts in FIG. 17, relative to the common electrode on the bottom surface that is assumed to be at zero volts. Further the voltages $V_{bottom}(i)$ are adjusted to optimize the linear change in angle between two electrodes, and the voltage $V_{top}(i)=V_{bottom}(i)+V_{topCommonStep2}$.

It should be understood that while in this description it was assumed that the bottom common electrode is always held at the reference potential of zero volts, adding or subtracting a voltage value to all electrodes (the plurality of electrodes on both surfaces, and the common electrodes on both surfaces) will have no effect on the device operation.

Steering Results: Efficiency Vs Steering

Finite difference time domain (FDTD) simulations are performed to estimate the steering efficiencies of all modeled director configurations. The steering performances (after about 40 ms relaxation time) are shown for a range of 1 to 15 degrees. All angles result in efficiencies over 80% with some angles showing 90% or higher. These efficiencies are higher than the prior art using and FFS structure and in-plane surface alignment, and also much faster than the previous device using a vertical director surface alignment.

U.S. Patent Application Publication No. 2021/0011353 A1, published Jan. 14, 2021, is incorporated by reference herein in its entirety and describes certain aspects that may be used in combination with aspects of the present disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A tunable optical beam steering device comprising:
   a first means for providing surface localized in-plane electric fields on a first substrate and also on a second substrate that together define a sandwich structure containing a liquid crystal material;
   a second means for providing electric fields between the two substrates that can be at an angle to the surface normal, or along the surface normal; and
   an alignment layer on a surface of each substrate that causes a liquid crystal director to align with a small angle relative to the surface normal and whose projection onto the plane of the substrates is different on the two substrates;
   wherein the device is configured to apply a voltage scheme comprising in sequence:
   a first voltage step for setting an azimuthal angle of a liquid crystal optical axis at all locations to create a linear spiral director configuration; and
   a second voltage step for causing the director to lie in the plane of the cell; and
   wherein the first voltage step is configured to generate fringe electric fields and diagonal electric fields.

2. The tunable optical beam steering device of claim 1, wherein the liquid crystal material has a negative dielectric anisotropy.

3. The tunable optical beam steering device of claim 1, further comprising:
   a third means for spacing the substrates apart by a distance approximately equal to the wavelength of the considered light to be steered divided by twice the birefringence of the considered liquid crystal material.

4. A tunable liquid crystal device comprising in sequence:

a first common conductive layer;

a first insulating layer;

a first array comprising a first plurality of parallel electrodes;

a first alignment layer;

a liquid crystal layer;

a second alignment layer;

a second array comprising a second plurality of parallel electrodes;

a second insulating layer; and a second common conductive plane;

wherein each electrode of the first plurality is located directly across from a different electrode from the second plurality; and wherein the device is configured to apply a voltage scheme comprising in sequence:

a first voltage step for setting an azimuthal angle of a liquid crystal optical axis at all locations to create a linear spiral director configuration; and a second voltage step for causing the director to lie in the plane of the cell; and wherein the first voltage step is configured to generate fringe electric fields and diagonal electric fields.

5. The tunable liquid crystal device of claim 4, wherein the second voltage step generates an electric field between the two substrates that causes the director to substantially lie in the plane of the layers.

6. The tunable liquid crystal device of claim 4, wherein a common reference voltage is applied to the first common conductive plane or the second common conductive plane in the first voltage step; wherein voltages applied to the first plurality of parallel electrodes vary in the first voltage step; and wherein differences in voltage between each electrode in the first plurality and the different electrode in the second plurality are the same in the first voltage step.

7. The tunable liquid crystal device of claim 4, wherein the same voltage is applied to the first common conductive plane and the first plurality of parallel electrodes in the second voltage step; and wherein 0 voltage is applied to the second common conductive plane and the second plurality of parallel electrodes in the second voltage step.

8. The tunable liquid crystal device of claim 4, wherein the device is capable of steering beams to an angle greater than 10° and/or with an efficiency greater than 80%.

9. The tunable liquid crystal device of claim 8, wherein:

the angle is in the range of +/−15°; and/or the efficiency is in the range of 50% to 90%; and/or a thickness of the liquid crystal layer defined as a distance between the first plurality of electrodes and the second plurality of electrodes is in a range of about one-half times the wavelength of light divided by the effective birefringence.

10. The tunable liquid crystal device of claim 5, wherein a width of each electrode of the first plurality of electrodes and the second plurality of electrodes is in a range of from about 0.1 μm to about 20 μm.

11. The tunable liquid crystal device of claim 5, wherein a length of each electrode of the first plurality of electrodes and the second plurality of electrodes is in a range of from about 1 millimeter to about 1 meter.

12. The tunable liquid crystal device of claim 5, wherein a height of each electrode of the first plurality of electrodes and the second plurality of electrodes is in a range of from about 10 nm to about 1000 nm.

13. The tunable liquid crystal device of claim 5, wherein a gap of the liquid crystal layer defined as distance between adjacent electrodes in the first plurality of electrodes is in a range of from about 0.5 μm to about 5 μm.

14. The tunable liquid crystal device of claim 5, wherein the substrates have an alignment layer that provides for the surface contacting liquid crystal director to have pretilt in a range of from about 0.1 to about 15 degrees from the layer normal on each substrate, and wherein the in-plane component of the surface contacting director is at an angle of between about 0.1 and about 10 degrees from a perpendicular to the axis of the electrodes and it has the same value but of opposite rotational sense on the two substrates.

15. A process for controlling a director field in a tunable liquid crystal device, the liquid crystal device comprising:

a first common conductive plane;

a first insulating layer;

a first array comprising a first plurality of parallel electrodes;

a first alignment layer;

a liquid crystal layer;

a second alignment layer;

a second array comprising a second plurality parallel electrodes; a second insulating layer, wherein each electrode of the first plurality is located directly across from a different electrode from the second plurality; and a second common conductive plane;

the process comprising in sequence:

a first voltage step for setting an azimuthal angle of a liquid crystal optical axis at all locations to create a linear spiral director configuration; and a second voltage step for causing the director to lie in the plane of the cell;

wherein the first voltage step is configured to generate fringe electric fields and diagonal electric fields.

16. The process of claim 15, wherein the second voltage step generates a strong vertical field with no fringe fields.

17. The process of claim 15, wherein no voltage is applied to the first common conductive plane or the second common conductive plane in the first voltage step; wherein voltages applied to the first plurality of parallel electrodes vary linearly in the first voltage step; and wherein differences in voltage between each electrode in the first plurality and the different electrode in the second plurality are the same in the first voltage step.

18. The process of claim 15, wherein:

the same voltage is applied to the first common conductive plane and the first plurality of parallel electrodes in the second voltage step; and wherein no voltage is applied to the second common conductive plane and the second plurality of parallel electrodes in the second voltage step; and/or both the top and bottom substrates have an alignment layer the provides for the surface contacting liquid crystal director to have pretilt in a range of from about 0.1 to about 15 degrees from the layer normal on each substrate, and wherein the in-plane component of the surface contacting director is at an angle of between about 0.1 and about 10 degrees from a perpendicular to the axis of the electrodes and it has the same value but of opposite rotational sense on the two substrates.

19. The tunable optical beam steering device of claim 1, wherein the device comprises in sequence:

a first common conductive layer;

a first insulating layer;

a first array comprising a first plurality of parallel electrodes;

a first alignment layer;

a liquid crystal layer;

a second alignment layer;

a second array comprising a second plurality of parallel electrodes;

a second insulating layer; and a second common conductive plane;

wherein the first alignment layer promotes a positive azimuthal pretilt of a first surface contacting the liquid crystal layer; and wherein the second alignment layer promotes a negative azimuthal pretilt of a second surface contacting the liquid crystal layer.

20. The tunable liquid crystal device of claim 4, wherein the first alignment layer promotes a positive azimuthal pretilt of a first surface contacting the liquid crystal layer; and wherein the second alignment layer promotes a negative azimuthal pretilt of a second surface contacting the liquid crystal layer.

\* \* \* \* \*